Sept. 4, 1934.   M. SCHNAIER   1,972,799
FROZEN CONFECTION
Filed March 26, 1930

INVENTOR
Milton Schnaier
BY
Dean, Fairbank, Hirsch & Foster
ATTORNEYS

Patented Sept. 4, 1934

1,972,799

UNITED STATES PATENT OFFICE 1,972,799

FROZEN CONFECTION

Milton Schnaier, New York, N. Y., assignor to The Popsicle Corporation of the United States, a corporation of Delaware Application March 26, 1930, Serial No. 438,937

1 Claim. (Cl. 99—16)

My present invention, while capable of a wider field of usefulness, is particularly adapted for embodiment in a frozen confection of the character in which a frozen molded edible body is served to the public with a handle attached thereto, so that the person eating the confection may conveniently hold the handle in his fingers without danger of soiling them. It is further concerned with a method of making such confections and with handle means for them.

This general type of confection is disclosed in prior Patent No. 1,505,592, granted to Frank W. Epperson and dated August 19, 1924, and preferably consists of a syrupy product frozen about one end of a porous wooden handle stick and bonded thereto by the freezing process. The confection is eaten by sucking the edible material while holding the device by the handle, much in the manner of an ordinary lollipop or all-day sucker.

One object of the present invention is so to associate a handle with the confection that the danger of soiling the fingers while consuming the delicacy is reduced to a minimum.

Another object is to insure against the inadvertent separation of the frozen dainty and its handle without the need for actually freezing the handle into the confection during the process of forming the latter.

In accordance with one embodiment of the invention, instead of freezing the confections to a handle, they are frozen in suitable molds and the handles subsequently applied as and when the confections are served, the handles being so designed that they will tend to melt their way into the confections and become intimately bonded with them by regelation.

The invention may be more fully understood from the following description in connection with the accompanying drawing, wherein Fig. 1 is a perspective view of a modified form of the invention in which the handle is applied subsequent to the freezing operation.

Figure 1:
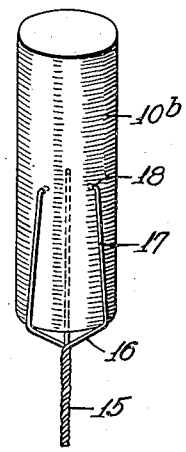

In Fig. 1, I have shown an embodiment of the invention in which the confections are frozen as solid blocks of material and the handles subsequently applied to them. Here the handle includes a plurality of spaced fairly fine gauge wires 17 slightly converging toward their free ends and formed at such ends with inwardly directed tips 18. The opposite ends of the wires are twisted together to form a handle 15, each wire being connected to the handle by an integral angular offset 16. The arms 17 together with the offsets 16, serve to form a skeleton basket adapted to be slipped over the end of the confection 10b. The wires are preferably springy and tend to converge toward their free ends so that as this basket like handle is applied to the confection, the wires have an inherent tendency to press inwardly toward the center of the confection, thereby causing the arms and their extension tips 18 to melt their way in and become firmly bonded and frozen to the icy body 10b by regelation.

Figure 2:
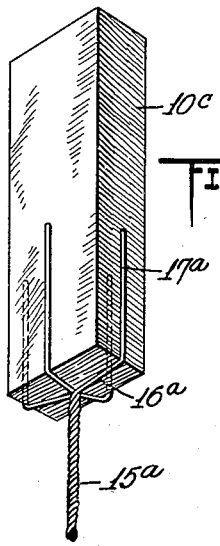
Fig. 2 is a perspective view of another modification.

In Fig. 2, there is shown another form of the invention which is in all substantial respects, quite similar to Fig. 1. Here however, the frozen confection 10c is of rectangular cross section and there are accordingly provided four spring wire arms 17a having their ends twisted to form a handle 15a to which the individual wires are connected by integral offsets 16a. In this case, one wire lies against and tends to press inwardly at each of the four sides of the confection and to embed itself and become frozen in the icy body.

Figure 3:
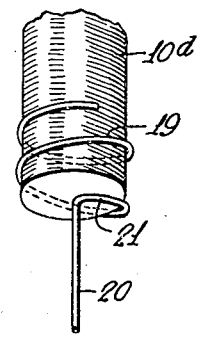
Fig. 3 is a fragmentary perspective detail illustrating a further modification.

In Fig. 3, there is shown another embodiment of the invention in which a handle is applied to the frozen confection 10d after the latter has been formed. This type of handle is characterized by the ease with which it may be applied to the confection 10d and also by the simplicity of its construction. It consists merely of a length of spring wire spirally bent to provide one or more convolutions 19 connected to a straight handle end 20 by a radial connecting piece 21, which lies flatly against the end of the body 10d. The inherent tendency of the convolute section of the wire is such as to cause it to contract to a diameter slightly less than the normal diameter of the confection itself. To apply this handle, it is merely necessary to squeeze the convolutions together, thereby enlarging their diameter so that they may be slipped over the confection in a frictionless manner until the member 21 abuts the end of the confection. Thereupon, when the convolute portion of the wire is released, the convolutions immediately spring apart and contract, tending to bite into the confection and become bonded thereto by melting and regelation.

While I have shown the confections as either rectangular or circular cross-sectional shape, it will be apparent that they may assume many other forms.

It will be understood in connection with Figs.

1, 2 and 3 that similar handles may be applied at each end on the pre-frozen body so that both hands may be employed in eating the confection and the danger of soiling the fingers minimized.

As many changes could be made in the above construction, and many apparently widely different embodiments of this invention could be made without departing from the scope thereof, it is intended that all matter contained in the above description or shown in the accompanying drawing shall be interpreted as illustrative and not in a limiting sense.

Having thus described my invention, what I claim as new and desire to secure by Letters Patent is:—

A confection comprising a frozen edible body and a holder, said holder having a plurality of spaced convolutions normally of a diameter slightly less than the body portion, said convolutions adapted to be increased in diameter by axial compression to slip over the end of the body portion and when the compression is released will tend to assume their normal diameter, the contraction causing the convolutions to firmly engage the frozen body and become embedded therein and bonded thereto by regelation.

MILTON SCHNAIER.